United States Patent [19]
Yamazumi et al.

[11] Patent Number: 5,271,679
[45] Date of Patent: Dec. 21, 1993

[54] ROLLING ELEMENT BEARING

[75] Inventors: Shuji Yamazumi; Tadayoshi Itabe; Teruaki Imai; Kenichi Sadakane, all of Kitakyushu, Japan

[73] Assignee: Kabushiki Kaisha Yaskawa Denki, Fukuoka, Japan

[21] Appl. No.: 838,290

[22] PCT Filed: Jul. 16, 1991

[86] PCT No.: PCT/JP91/00949
§ 371 Date: Mar. 5, 1992
§ 102(e) Date: Mar. 5, 1992

[30] Foreign Application Priority Data

Jul. 16, 1990 [JP] Japan ............... 2-188786

[51] Int. Cl.[5] .................................. F16C 33/44
[52] U.S. Cl. ............................. 384/527; 384/908; 384/909; 384/911; 384/913
[58] Field of Search ............... 384/527, 576, 609, 618, 384/911, 908, 909, 913

[56] References Cited

U.S. PATENT DOCUMENTS 3,027,626  4/1962  Murphy ..................... 384/527

FOREIGN PATENT DOCUMENTS 44-7922    3/1969  Japan.
60-37417   2/1985  Japan.
62-49017   3/1987  Japan.
3-129120   6/1991  Japan.

Primary Examiner—Lenard A. Footland
Attorney, Agent, or Firm—Jordan and Hamburg

[57] ABSTRACT

A rolling element bearing having balls and races, each having the surface of rolling contact coated with a laminar solid lubricant, such as molybdenum or tungsten disulfide, and a retainer made of a heat-resistant composite material having self-lubricating properties. The retainer material is composed of a polyether ether ketone resin, a polytetrafluoroethylene resin, one or both of molybdenum and tungsten disulfides, and polyamide fibers. During the initial period of its use, the bearing is lubricated by the $MoS_2$ with which the surfaces of rolling contact are coated, and as the films of $MoS_2$ become worn with the passage of time, the frictional contact between the balls and the retainer transfers an appropriate amount of material from the retainer to the surfaces of the balls and, further, to the track surfaces of the races to continuously form lubricating films thereon. The bearing is, therefore, not substantially worn during its use in a vacuum, or in air, but has a long life.

3 Claims, 3 Drawing Sheets

→ moving direction of lubricating film

⇒ rotating direction

PEEK: 60
PTFE: 20
aramid fibers: 10
$MoS_2$: 10
(weight %)

PEEK: 60
PTFE: 20
aramid fibers: 20
(weight %)

PEEK: 100
(weight %)

ROLLING ELEMENT BEARING

FIELD OF ART

This invention relates to rolling element bearings which are used in a vacuum, in an environment having a high or low temperature, in the presence of radioactive rays, or in any other environment not permitting the use of any lubricating oil, or grease.

BACKGROUND OF THE INVENTION

There are three known methods for lubricating rolling element bearings for machines operating in an environment not permitting the use of any lubricating oil, or grease:

(1) A thin lubricating film of, for example, molybdenum disulfide ($MoS_2$), tungsten disulfide ($WS_2$), or silver (Ag) is formed by sputtering, or otherwise, on the sliding surfaces of all or a pert of the inner and outer races, the retainer and balls, as typically described in Japanese Patent Unexamined Publication No. 55-57717, 58-113629 or 61-55410;

(2) A retainer is made of a sintered alloy produced by adding a solid lubricant, such as $MoS_2$ or $WS_2$, to a metal or alloy, and the retainer material is transferred by the friction between the retainer and balls to the balls, and from the balls to the inner and outer races, to form a thin lubricating film on each of the balls, and inner and outer races, as typically described in Japanese Patent Unexamined Publication No. 62-151539 or 63-246507; and (3) A retainer is formed from a plastic material or a composite high-molecular material prepared by adding a solid lubricant to the plastic material, and the retainer material is transferred by the friction between the retainer and balls to the balls, and from the balls to the inner and outer races, to form a thin lubricating film on each of the balls, and inner and outer races. Typical examples are retainers formed from fluororesins known as Rulon E (tradename of NTN Rulon) and Duroid (tradename of Rogers Corp., U.S.A.). These retainers are formed from a mixture of a polytetrafluoroethylene resin (hereinafter referred to simply as "PTFE"), glass fiber and $MoS_2$.

The preliminary formation of thin lubricating films as described in (1) above, however, generally causes a bearing to have a short life, since the frictional wear of the films results in the loss of their lubricating effect and the exposure of the metal as a base material, causing its seizure.

The retainer made of a sintered metal as described in (2) above has the drawbacks of being difficult to machine, making significant friction noise, brittleness, cracking during use, and being heavily worn when exposed to air.

A bearing including a retainer formed from PTFE reinforced by glass fiber as described in (3) above has the drawbacks of quickly becoming worn, generating so much heat as to be likely to cause a variation of torque during use, since the glass fibers projecting from the surface of the retainer scrape off the lubricant transferred from the retainer and roughen the surfaces of the balls.

According to the solution as proposed, for example, in Japanese Patent Unexamined Publication No. 62-261718, hydrofluoric acid is used to melt glass fibers away from the machined surfaces of the retainer. Hydrofluoric acid is, however, toxic and its handling calls for special care. Moreover, glass fibers are exposed sooner or later again on the retainer surfaces, because of the wear of PTFE, and exert an adverse effect on lubrication similar to no such treatment being given at all.

There are also known retainers formed from composite materials containing high-molecular materials other than PTFE. A retainer formed form thermally stable polyimides, however, has the drawback of producing a large amount of gas in a vacuum. Japanese Patent Publication No. 63-1989 describes a retainer formed from a composition comprising a thermoplastic polyether aromatic ketone, a fluororesin and aromatic polyamide fibers. This retainer, however, has the drawback of being unevenly worn due to a greatly varying coefficient of friction, and thereby causing a variation of torque and axial deflection.

The known retainers formed form composite high-molecular, or sintered materials get worn more rapidly in their portions on which a load bears, and fail to supply the lubricant uniformly to the inner and outer races, and to the balls. The bearings including such retainers have, therefore, the drawbacks of being unstable in torque, producing a large amount of dust, and having a short life.

Under these circumstances, it is an object of this invention to provide a rolling element bearing which has an improved degree of lubrication owing to the steady and uniform transfer of a lubrication, and has a low level of torque and a long life, produces only a small amount of dust and gas, makes only a slight noise, and is easy and inexpensive to manufacture.

DISCLOSURE OF THE INVENTION

This invention resides in a rolling element bearing which comprises balls and races each having the surface of rolling contact coated with a layer of solid lubricant, such as molybdenum disulfide or tungsten disulfide, and a retainer made of a heat-resistant composite material having self-lubricating properties.

The composite material of which the retainer is made comprises a polyether ether ketone resin, a polytetrafluoroethylene resin, one or both of molybdenum disulfide and tungsten disulfide, and polyamide fibers.

During the initial period of rotation of the bearing, the solid lubricant $MoS_2$ or $WS_2$ functions to lubricate the surfaces of the balls and the races, which are coated with it. As the coating films wear with the passage of time, the friction between the balls and the retainer transfer the solid lubricant from the retainer to the surfaces of the balls to form thin films of the lubricant which lubricate the balls and the races, so that the bearing can be steadily lubricated for a long time.

The polyether ether ketone resin (hereinafter referred to simply as "PEEK") which is used to make the retainer is tough, highly resistant to heat, and self-lubricating, but is difficult to transfer when used alone. Therefore, PTFE, and one or both of $MoS_2$ and $WS_2$, which are low-friction, low-wear and heat-resistant laminar solid lubricants which are easy to transfer and do not produce a large amount of gas in a vacuum, are added in appropriate amounts with PEEK to facilitate steady transfer and to form films having improved lubricating properties.

Any reduction in hardness and strength that would result from the addition of these materials can be prevented by the addition of a heat-resistant organic fibrous reinforcing material.

The reinforcing material is required:

(a) To withstand the temperature at which the PEEK resin is melted for molding;

(b) To exhibit a reinforcing effect in the temperature range in which the bearing is used;

(c) To be self-lubricating, so that no fiber projecting from the surface of the retainer may scrape thin lubricant films off the balls, or roughen the surfaces of the balls or the track surfaces of the inner and outer races, and thereby hinder the proper lubrication thereof (d) To avoid producing a large amount of gas in a vacuum;

(e) To well maintain the PEEK resin's moldability and machinability; and (f) To avoid making any large noise from friction.

Aromatic polyamide, aromatic polyamide-imide (PAI), and polyether-imide (PEI) fibers are examples of heat-resistant organic fibers which satisfy the requirements listed above. Aromatic polyamide (aramid) fibers are, among others, preferred from the standpoints of cost, easy availability, reinforcing effects, ease of handling, etc.

The aramid fibers are self-lubricating, and do not exert any adverse effect on lubrication as glass fibers do, even if they are exposed on a friction surface. Although PTFE itself shows a greatly varying coefficient of friction, the addition of one or both of $MoS_2$ and $WS_2$ enables the formation and uniform and stable lubricating films showing a lower degree of variation in the friction coefficient.

FIG. 5 shows the results of pin-on-disk friction tests conducted on composite materials containing a PEEK resin to determine their dynamic friction coefficients and their wear in a vacuum. A mixture of PEEK, PTFE and aramid fibers showed greatly varying dynamic friction coefficients in a vacuum, as shown in (b) in FIG. 5, though its average value lessened with the distance of friction. A mixture further containing an appropriate amount of $MoS_2$ showed a lower friction coefficient with a smaller variation, as shown in (a) in FIG. 5. The PEEK used alone showed a greater range of friction and a greater degree of wear, as shown in (c). The examination of the friction surfaces confirmed that the addition of $MoS_2$ had been effective, as a thin film of transferred material had spread uniformly on the whole friction surface when the composition shown in (a) was used, while no uniform film had been formed when the composition shown in (b) or (c) was used. These results confirmed that the composite material containing $MoS_2$ produced a very small amount of friction, and could make a retainer of low friction and wear capable of continually forming a thin film by transfer with any surface containing it. A composite material comprising PEEK, aramid fibers and $MoS_2$, and not containing PTFE was found to become too heavily worn to be suitable for a retainer.

Although the foregoing describes a case in which $MoS_2$ is used, it is equally possible to use $WS_2$, which is also a substance having a laminar structure, or a mixture of $MoS_2$ and $WS_2$.

A retainer can be made if a mixture of various materials as hereinabove mentioned is injection, extrusion, or compression molded under the conditions which are usually employed for making a molded product or PEEK.

The PEEK resin and all the other materials used with it to make a retainer produce only a small amount of gas in a vacuum, and it necessarily follows that the molded product thereof produces only a small amount of gas.

DESCRIPTION OF THE PREFERRED EMBODIMENT

The invention will now be described in further detail with reference to the drawings.

Figure 1:
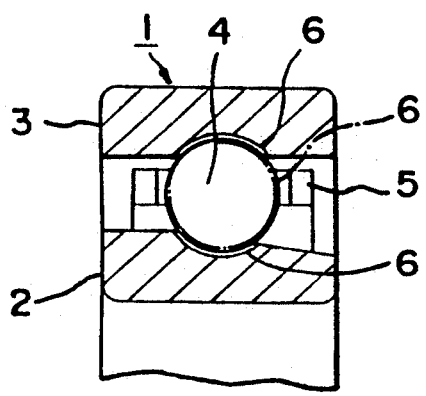
FIG. 1 is a cross sectional view of an angular contact rolling bearing embodying this invention.

FIG. 1 is a cross sectional view of a solid-lubricated angular contact rolling bearing 1 embodying this invention. A film 6 of $MoS_2$ having a thickness of 0.5 micron was formed by sputtering on each of the track surfaces of the inner and outer races 2 and 3 made of stainless steel SUS 440C, and the surfaces of balls 4.

Figure 2:
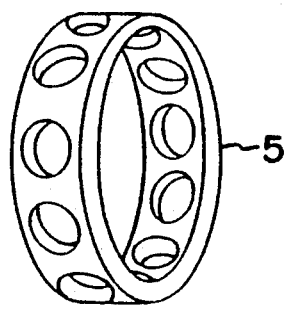
FIG. 2 is an enlarged perspective view of the retainer in the bearing of FIG. 1.
Figure 3:
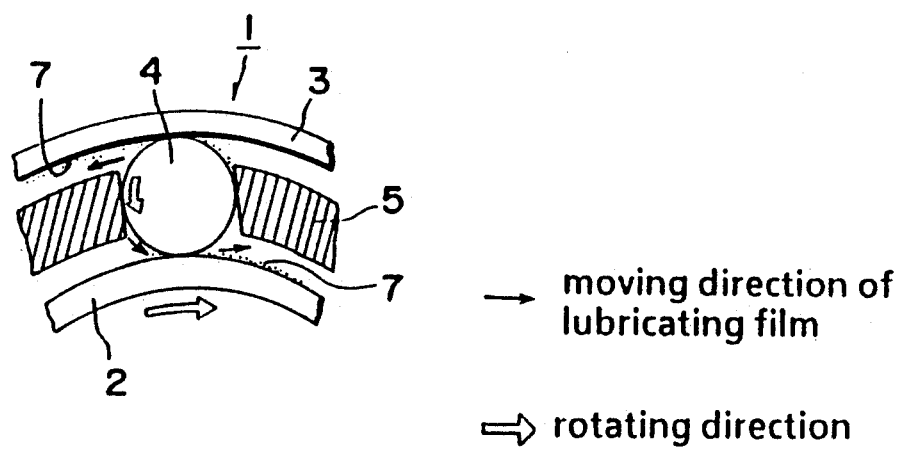
FIG. 3 is a front elevational view, partly in section, of the bearing embodying this invention.

FIG. 2 is a perspective view of a retainer 5. It is identical in shape to a conventional retainer of the bore type, but was made from different materials by a different process, as will hereunder be described.

The materials listed below were used for making the retainer 5:

| | |
|---|---|
| PEEK: | "PEEK" of ICI, England (a powdery material withstanding continuous use at a temperature of 240° C. and having a melting point of 334° C.); |
| PTFE: | "Teflon 7J" of Mitsui Du Pont Fluorochemical Co.; |
| Aramid fibers: | "Kevlar 49" of Du Pont (chopped strands having a length of 1 mm); |
| $MoS_2$: | "Molykote Microsize" of Dowcorning. |

These materials were mixed in the weight proportions listed below to prepare a dry mixture:

| | | |
|---|---|---|
| (1) | PEEK: | 60% |
| (2) | PTFE: | 20% |
| (3) | Aramid fibers: | 10% |
| (4) | $MoS_2$: | 10% |

The mixture was melted, and extruded by an extruder having a compression ratio of 3/1 and a temperature of 350° C. to 380° C. to make a molded round bar of uniform composition having a diameter of 20 mm. The round bar was machined to make a retainer of the bore type adapted for fitting an angular contact rolling bearing having an inside diameter of 8 mm, and outside diameter of 22 mm and width of 7 mm.

The retainer, inner and outer races, and balls were put together to fabricate the angular contact rolling bearing 1 as shown in FIG. 1.

A durability test was conducted to determine the torque of the bearing in operation, its life, and the wear of the retainer. The test was conducted under these conditions:

| Atmospheric Pressure: | (2 to 4) × $10^{-7}$ torr, open air; |
|---|---|
| Thrust load: | 7 kgf; |
| Bearing temperature: | 120° C.; |
| Rotating speed: | 1800 rpm. |

For the sake of comparison, similar test were conducted on bearings having retainers made of five kinds of different materials as listed below:

(A) A sintered Cu-Sn alloy containing 30% $WS_2$ and $MoS_2$;

(B) A cast alloy comprising 80% Cu, 10% Sn and 10% Pb;

(C) Ceramics containing $B_4C$;

(D) An Ekonol resin (aromatic polyester); and (E) Rulon E (fluororesin).

Figure 4:
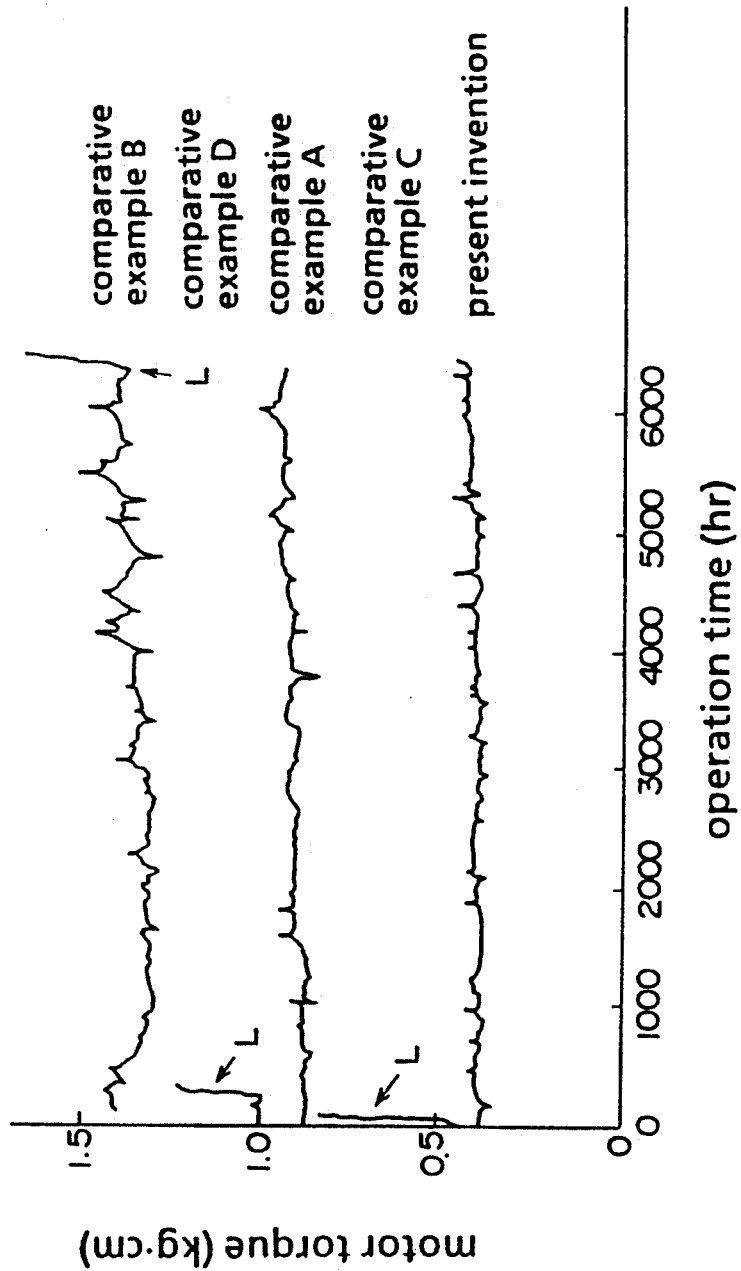
FIG. 4 is a chart showing a variation of torque as observed with the passage of time on each of the bearings embodying this invention and comparative examples of bearings, and their life.
Figure 5A:
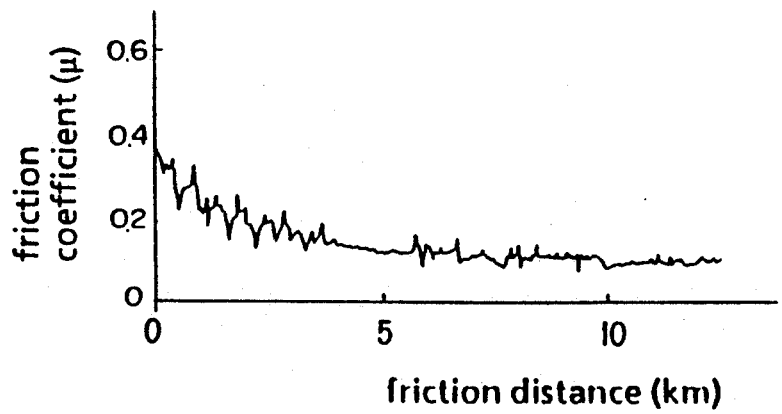
FIGS. 5(a), 5(b), and 5(c) are charts showing the friction coefficients of retainer materials as determined by a model testing machine.
Figure 5B:
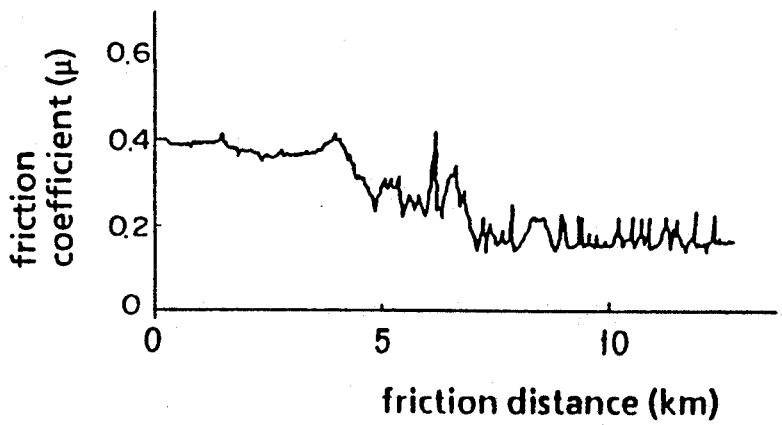
Figure 5C:
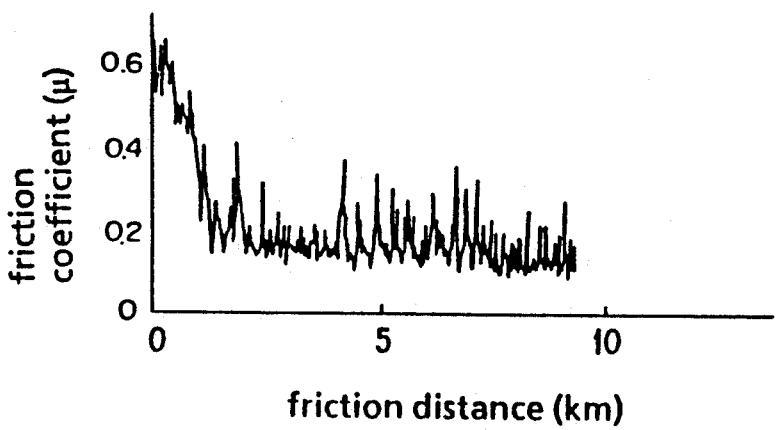

The results of the tests are shown in FIG. 4 and TABLE 1.

As is obvious from FIG. 4, it is desirable for the torque in operation to be small to reduce any loss at the bearing. The failure of the bearing to be properly lubricated brings about an increase of torque and results in the seizure of the bearing, resulting in the end of its life. In the chart, L indicates the end of the life of the bearing.

The bearing of this invention has a smaller amount of torque having a smaller variation, and a longer life than any of the bearings in the comparative examples.

Referring to TABLE 1, 'wear' means the worn volume of the retainer per revolution ($1 \times 10^{-8}$ mm$^3$/rev). The results shown in TABLE 1 confirm that the retainer in the bearing of this invention is more resistant to wear, both in a vacuum and exposed to air, than any of the comparative retainers.

Although the retainer is described as having been made by extrusion molding and machining, it is also possible to make a retainer by injection or compression molding if an appropriate mold is prepared.

TABLE 1

Wear of Retainers as Determined by Durability Tests

| Retainer Materials | Wear | |
|---|---|---|
| | In a vacuum | In air |
| Invention | 2.84 | 2.78 |
| Comparative Example (A) | 3.02 | 8.18 |
| Comparative Example (B) | 6.17 | 594.1 |
| Comparative Example (C) | 55.1 | — |
| Comparative Example (D) | 21.1 | — |
| Comparative Example (E) | — | 2.87 |
| Comparative Example (F) | 3.48 | 3.58 |

The retainer can be formed from a composite material containing 10 to 40% by weight of PTFE, 5 to 30% by weight of aramid fibers, and 5 to 30% by weight of $MoS_2$ or $WS_2$, the balance thereof being PEEK. The use of any composition containing less than 10% by weight of PTFE is undesirable, as it results in a retainer which is low in wear resistance. The use of any composition containing more than 40% by weight of PTFE is also undesirable, a sit results in a retainer of low strength. The use of any composition containing less than 5% by weight of aramid fibers results in a product of low strength. Any composition containing more than 30% by weight of aramid fibers is too low in flowability to be molded. The use of any composition containing less than 5% by weight of $MoS_2$ or $WS_2$ results in a product of low wear resistance. Finally, the use of any composition containing more than 30% by weight of $MoS_2$ or $WS_2$ results in a product of low strength.

As is obvious from the foregoing description, the rolling element bearing of this invention having the surface of rolling contact coated with the solid lubricant $MoS_2$, and a retainer made of a PEEK resin composition containing PTFE, aramid fibers and $MoS_2$, and having a lubricating action, is properly lubricated by the $MoS_2$ on the surfaces of rolling contact during the initial period of use, and as the films of $MoS_2$ on the surfaces of rolling contact become worn with the passage of time, the frictional contact between the ball 4 and the retainers 5 transfers an appropriate amount of material from the retainer to the surfaces of the balls and, further, to the track surfaces of the races to continuously from lubricating films 7 thereon. Therefore, the bearing is not substantially worn during its use in a vacuum, or in air, and has a long life. Thus, it is maintenance-free over a long period of time because of the low amount of friction and the long life, makes only a small amount of friction noise, produces only a small amount of gas even in a vacuum, and is inexpensive as compared with any conventional rolling contact bearing supplied with a solid lubricant.

INDUSTRIAL FEASIBILITY

The bearing of this invention is suitable for use with a conveying device used in a wafer, or other semiconductor manufacturing apparatus (in a vacuum, or at a high temperature), a machine or apparatus used in outer space (in a vacuum, or at a high or low temperature), or an unmanned robot working in facilities involving the production or use of atomic energy, or any other machine or apparatus used in a vacuum, at a high or low temperature, or in the presence of radioactive rays.

We claim:

1. A rolling element bearing comprising an outer race, an inner race, balls, and a retainer holding said balls in an appropriately spaced relation from one another, said retainer being a product of a mixture of polytetrafluoroethylene, $MoS_2$ or $WS_2$, aramid fibers, and a polyether ether ketone resin.

2. A bearing as claimed in claim 1, wherein the surfaces of said balls and the track surfaces of said races are coated with $MoS_2$ or $WS_2$.

3. A bearing as claimed in claim 1, wherein said mixture contains 10 to 40% by weight of polytetrafluoroethylene, 5 to 30 by weight of aramid fibers, and 5 to 30% by weight of $MoS_2$, the balance of its composition being of said polyether ether ketone resin.

* * * * *